Jan. 10, 1956

O. T. HUTCHINSON 2,730,284

PEA AND BEAN FILLING MACHINE

Filed April 6, 1953

INVENTOR.
Oscar T. Hutchinson
BY Oscar T. Hutchinson
DESIGNER

Jan. 10, 1956　　　O. T. HUTCHINSON　　　2,730,284
PEA AND BEAN FILLING MACHINE
Filed April 6, 1953　　　3 Sheets-Sheet 2

INVENTOR.
Oscar T. Hutchinson
BY Oscar T. Hutchinson
DESIGNER

Jan. 10, 1956   O. T. HUTCHINSON   2,730,284
PEA AND BEAN FILLING MACHINE
Filed April 6, 1953   3 Sheets-Sheet 3

INVENTOR.
Oscar T. Hutchinson
BY Oscar T. Hutchinson
DESIGNER 2,730,284

PEA AND BEAN FILLING MACHINE

Oscar T. Hutchinson, Salem, N. J.

Application April 6, 1953, Serial No. 347,076

2 Claims. (Cl. 226—97)

The present invention relates to a machine for filling solid material such as peas and beans and liquid such as salt brine or tomato sauce into containers such as tin cans or glass jars.

Particular reference is to a universal machine which can be quickly converted over to receptacles of different dimensions as to cross section and height.

Another object of the invention is in reference to a machine having sufficient number of measuring and discharge pockets for high speed production with no waste of material and to give a very accurate fill.

Yet another object of the apparatus is the provision for a no can no fill. When a container enters the machine and moves forward it contacts a guide in the path of container, which during the absence of a container is at rest in a forward position. Said containers move the guide outward which opens the slide plates at the base of the measuring pockets to permit the peas or beans to be discharged through the center of filling valves into containers. Should no containers enter filler the said plates will always remain closed.

Reference is to means provided for measuring and discharging of liquid. When containers enter the machine they are raised by lift tables to open the filling valves which will discharge a measured quantity of liquid into containers.

Particular reference is to the method by which the liquid is measured. The apparatus provides a liquid supply tank surrounding a center shaft with measuring pockets in the tank, means for opening and closing a hole at base of the pockets for measuring the liquid to be deposited through the space surrounding and sealed off from the means to measure and discharge solid material. However should no containers enter the machine there will be no discharge of the liquid. The method of controlling the liquid is a new departure over previous designs in pea and bean filling machines now being used in canning plants.

Many other feautres of the invention will be disclosed as it is better understood, whereas the solids and liquid are measured and discharged independently and individually in each valve while traveling to carry the product, eliminating the necessity of measuring pockets and the product sliding on a stationary plate beneath the pockets.

Reference is made to the simplicity of the lower structure. The machine is driven by chain and sprockets, with a limited amount of gears involved.

Reference is made to the means for adjusting of the filling head to accommodate containers of various height, and means for a thorough and speedy cleaning of the machine.

The many advantages of the apparatus will be better understood from the description and drawings.

Figure 1:
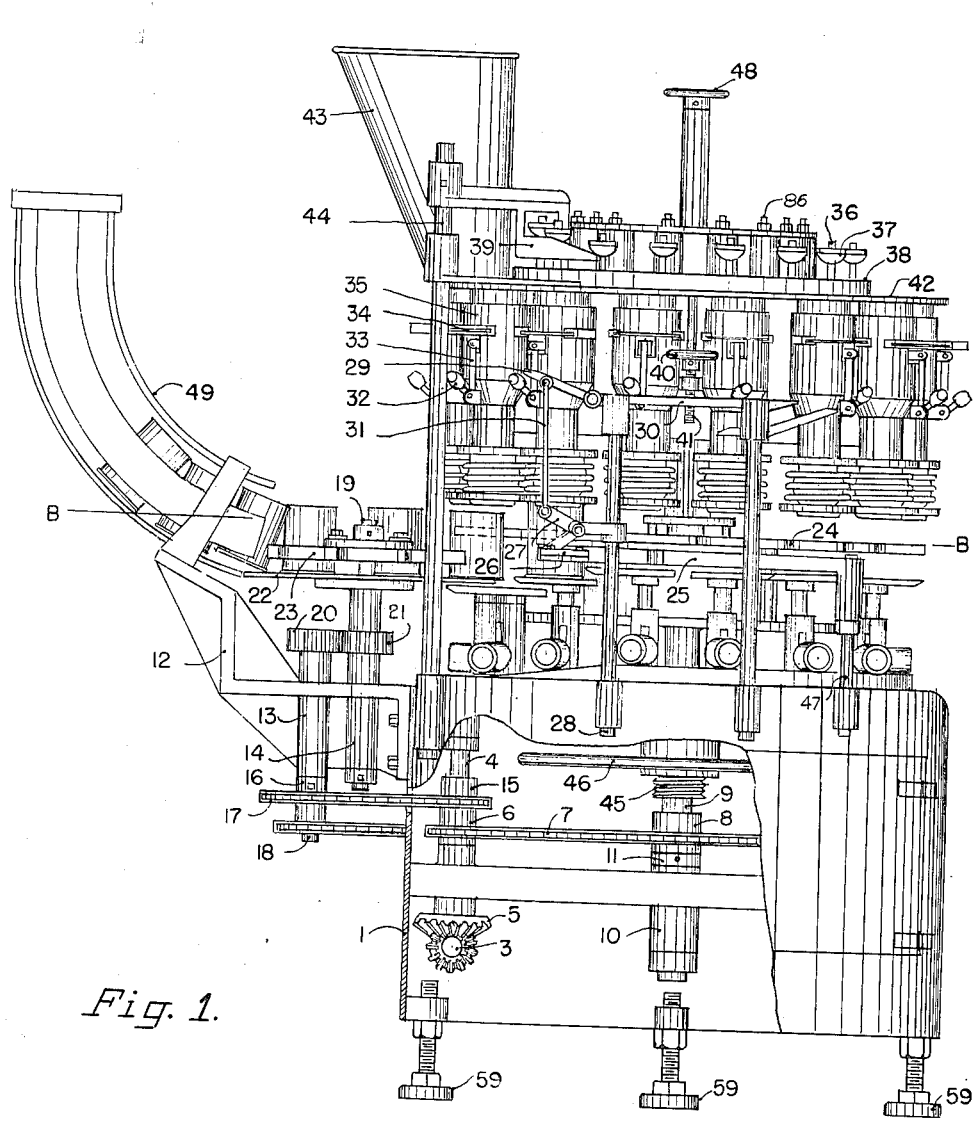
Fig. 1 is an elevation view of the machine as it generally appears to show the drive parts, the no can no fill, feeding of containers, liquid tanks and parts therein.

In Figure 1, I have shown a circular base 1, with four adjustable feet 59, a horizontal drive shaft 3, a vertical shaft 4 connected by bevel gears 5 on shaft 3—4, a sprocket 6 connected by chain 7 to sprocket 8 on center shaft 9, said shaft having a lower bearing 10 with a thrust bearing 11 fixed to shaft by taper pin and set screw, and a can feed bracket 12 attached to base 1 having bearings 13—14, a sprocket 15 on vertical shaft 4. A sprocket 16 is connected by chain 17 to the vertical can feed drive shaft 18. A vertical can feed second shaft 19 is connected by spur gears 20—21 of equal ratio to rotate the can feed disc 22 and feed turret 23 in the proper direction, placing containers in pocket of center turret 24 beneath the filling valves.

The no can no fill mechanism can be better understood by reference to can guide 25 pivoted on a fixed upright shaft 47 which guide rests in a forward position. As a container moves into the machine to a contact point of the guide 25 it is moved outward. Said guide 25 is connected by a link 26 to an L shape lever 27 fixed to shaft 28. Said guide moves outward to raise a pivoted gate 29, a part of track 30, the gate 29 and L-shaped lever 27 which is connected by a rod 31. The container raises the gate allowing roller 32 on lever 33 connected to plate 34 in filling valve 35 to travel under the gate 29 to open slide plate to discharge solids into container. In the absence of a container the gate will move down on a line with track 30 the roller 32 will travel over the track 30 whereby the plate 34 will remain closed. The length of gate 29 is less than the distance between centers of rollers.

The valve stem 36, with head 37, are inside liquid supply tank 38, rotating in succession to contact a stationary cam track 39, which raises and lowers the rubber ball valve to control the measuring and discharging of liquid.

The four hand wheels 40, being at ninety degrees, fixed on an adjusting rod 41 are to support the upper half of telescopic measuring pockets 42, which also provides for adjustment for quantity of solids.

The feed hopper 43 is stationary, supported by two shafts 44, which the measuring pockets travel under to receive the peas or beans.

The upper bearing 45 for center shaft 9 is threaded outside with a hand wheel 46 to adjust filling head for various height containers.

The hand wheel 48 is to adjust telescope plugs 60 having an air vent 86 in center to adjust up or down in the pockets 59 to determine the measure of liquid.

The curved feed chute 49 moves the containers into pocket of feed turret 23 which will transfer containers to the pocket of center turret 24 under filling valves.

Figure 2:
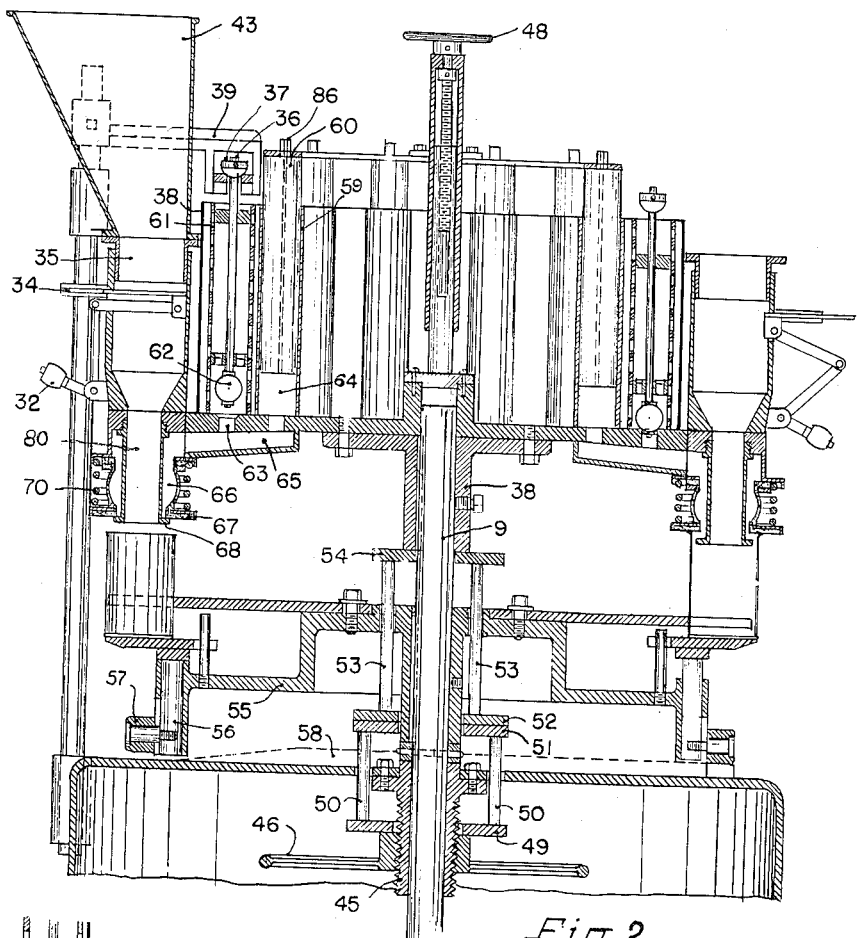
Fig. 2 is a sectional elevation taken along the plane indicated by line A—A in Figure 5 showing the adjustment for height of containers and the means for measuring solids and liquid.

In Fig. 2 I have shown a threaded hand wheel 46 on bearing 45, a plate 49 with rods 50—50 extending upward to plate 51 which is constant, a moving plate 52 resting on plate 51 connected by rods 53—53 to upper plate 54 supporting filling tank 38. By releasing the set screws, adjustment is provided for various height containers.

Mounted on center shaft 9 is a circular disc 55 supporting lift tables 56 with rollers 57 which travel on a cam track 58, to raise the tables and containers to open the valves 67 to discharge contents of liquid measure pockets. Rollers 32 controlled by the containers open the slide plate 34 to discharge the solids.

The liquid supply tank 38 has measuring pockets 59 with adjusting plugs 60 with air vents 86 controlled by hand wheel 48. Perforated tubes 61 prevent peas or beans from entering liquid ports and serve as guides for rubber balls 62, which are raised by stationary cam track 39 above holes 63 to fill measuring pockets 64—65—66, which then descend to close supply holes 63 to seal the measure of liquid. When a container enters the machine it raises valve 67 against spring 70 above stationary valve set 68, providing a discharge space for liquid, which is shown more clearly in Figure 3. The retaining plate 34 is shown in closed position which opens when a container enters machine shown more clearly in Figure 3.

Figure 3:
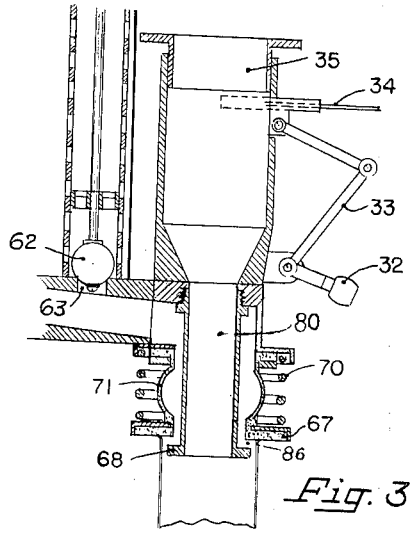
Fig. 3 is a sectional view of the valve or filling head, showing the position of the slide or retaining plate in the measure pockets to measure and discharge solid material, also showing the spherical rubber ball sealing the liquid supply hole from the tank, also showing the filling valve raised to discharge the liquid.

In Fig. 3 I have shown slide plate 34, roller 32, and lever 33 in a position to discharge solids into container, and also have shown valve plate 67 with rubber 71 moved upward against spring 70, above stationary valve seat 68 to provide an opening 86 for the flow of liquid into the container.

The spherical rubber ball 62 is shown closing supply hole 63 to seal contents in the measuring pocket.

Figure 4:
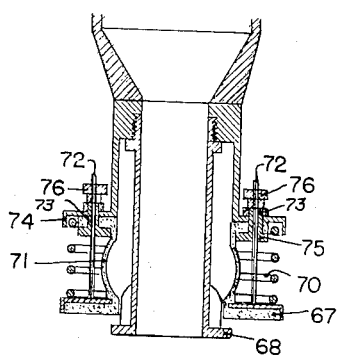
Fig. 4 is a sectional view of valve showing the rods which raise the rubber disc above the stationary valve seat to allow water to pass through the valve and filler for cleaning which will then be lowered to a filling position.

In Fig. 4 I have shown rods 72—72 in valve plate 67 passing through sleeves 73—73 to clamp rubber 71 to plate 74 by plate 75. Nuts 76—76 are moved down to raise plate 67 above valve seat 68 providing space for cleaning, then moved up sufficient to seal plate on seat 68 by spring 70 to a filling position.

Figure 5:
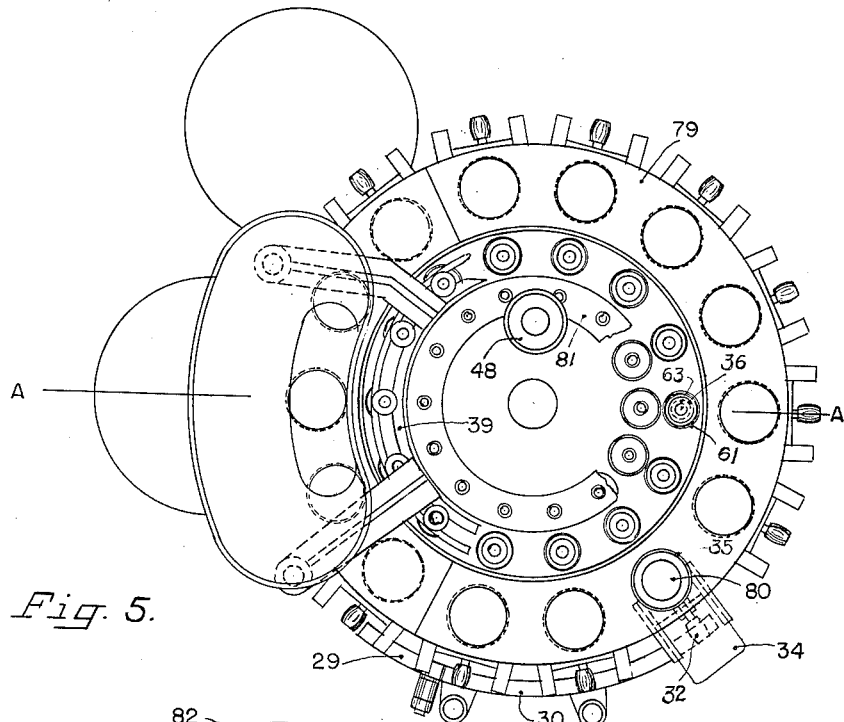
Fig. 5 is a top plan view taken at the extreme top of the machine showing the relation of various parts.

Fig. 5 is a top view of the measuring pockets 35 for solids, a part of plate 79, with openings 80, through which the solids pass into container. Fig. 5 also shows liquid adjusting hand wheel 48, a part of plate 81, perforated tubes 61 serving as guides for liquid control valves 36, the stationary track 30 controlling the opening and closing of holes 63, which supply the liquid measuring pockets between the point of feed and discharge of containers. Fig. 5 also shows rollers 32 which operate the slide plates 34 by track 30 through moveable gate 29.

Figure 6:
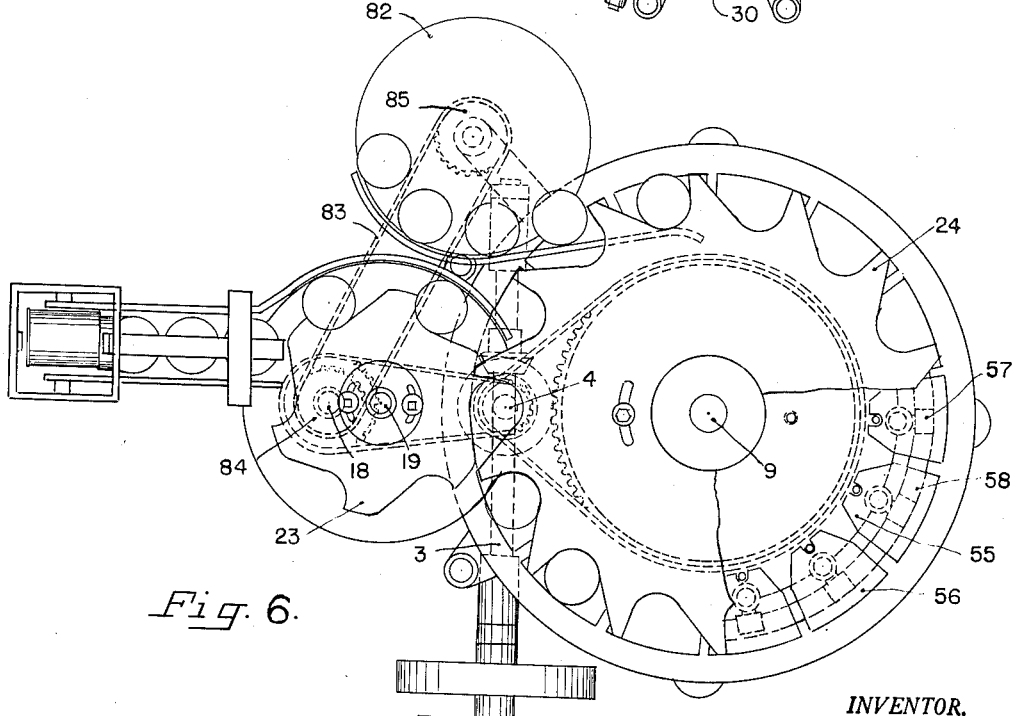
Fig. 6 is a top plan view taken along a plane indicated by line B—B, Figure 1, showing lift tables which raise containers, the feeding of containers by a chute to a turret which transfer containers to a pocket of a turret under the filling valves.

Fig. 6 shows base 1, also shown in Figure 1, supporting cam track 58 operating lift tables 56, through rollers 57, supported by a circular plate 55 by shaft 9, a turret 24 under filling head to receive containers from feed turret 23, conveying containers through filler to discharge disc 82, driven from shaft 18 by chain 83 and sprockets 84—85 Fig. 1, by a drive shaft 3 and upright shaft 4.

From the above description it is apparent I have invented or discovered, built and operated a filling machine for solids and liquid which will be accepted by the canning industry.

I claim:

1. A filling machine having a liquid tank revolving on a horizontal plane about a common axis, having liquid measuring pockets, telescopic adjusting plugs having air vents, means for a universal adjustment for quantity of liquid, measuring pockets within said tank radially in line with center of filling valves projecting upward and sealed off from liquid in supply tank, said pockets having a small hole at the base of each pocket to flow liquid into measuring pockets, horizontal ports below said holes extending to a space surrounding and sealed off from the center hole of valves through which the solids are discharged, a second hole in base of liquid tank radially in line with valves and over said ports, located between first mentioned holes beneath measuring pockets and the valve, perforated tubes surrounding the holes fixed to and rotating with said tank, spherical rubber balls within perforated tubes having rods extending upward with guides on rods to center the spherical balls over the holes, knobs on upper end of said rods, a stationary cam track above said rubber balls to open holes for filling measuring pockets and to close holes to seal the measure of liquid in the pockets, means to discharge contents of measuring pockets into containers after they enter the machine to lift filling valves, and means for rotating all measuring and discharge parts, and means for individually and independently measuring and discharging solids and liquid in each valve.

2. In a filling machine of the class described, comprising means for moving container horizontally about a vertical rotating axis, a first material discharge member disposed above said container, a second discharge member having a rubber cylindrical member surrounding the first discharge member, a space surrounding the first member and the inside of said cylindrical rubber member comprising a part of the space for the measuring of liquid, an annular seal adjacent the end of said first member, means to move container upward to elevate the cylindrical rubber member above the said sealing member to provide an opening for the discharge of liquid into container.

References Cited in the file of this patent
UNITED STATES PATENTS

| | | |
|---|---|---|
| 1,154,374 | Cerruti | Sept. 21, 1915 |
| 1,445,297 | Colbert | Feb. 13, 1923 |
| 1,458,903 | Holmquist | June 12, 1923 |
| 1,534,035 | Steere | Apr. 21, 1925 |
| 1,537,170 | Holmquist | May 12, 1925 |
| 1,956,024 | Hansen | Apr. 24, 1934 |
| 2,196,403 | Thompson | Apr. 9, 1940 |
| 2,303,822 | Chapman | Dec. 1, 1942 |